US009769184B2

(12) United States Patent
Smith et al.

(10) Patent No.: US 9,769,184 B2
(45) Date of Patent: *Sep. 19, 2017

(54) METHOD AND SYSTEM FOR MISUSE DETECTION

(71) Applicant: Cyveillance, Inc., Reston, VA (US)

(72) Inventors: Steve Smith, Vienna, VA (US); Vlad Serban, McLean, VA (US); Andy Walker, Alexandria, VA (US); Greg Ogorek, Ashburn, VA (US)

(73) Assignee: LOOKINGGLASS CYBER SOLUTIONS, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,584

(22) Filed: Jun. 26, 2015

(65) Prior Publication Data

US 2015/0304347 A1 Oct. 22, 2015

Related U.S. Application Data

(63) Continuation of application No. 12/436,380, filed on May 6, 2009, now Pat. No. 9,148,445.

(60) Provisional application No. 61/051,237, filed on May 7, 2008.

(51) Int. Cl.
*H04L 29/06* (2006.01)
*G06F 21/55* (2013.01)

(52) U.S. Cl.
CPC ........ *H04L 63/1408* (2013.01); *G06F 21/554* (2013.01); *H04L 63/0823* (2013.01); *H04L 63/1416* (2013.01); *H04L 63/1483* (2013.01); *H04L 63/168* (2013.01); *G06F 2221/2119* (2013.01)

(58) Field of Classification Search
CPC .......... G06F 21/554; G06F 2221/2119; H04L 63/1416; H04L 63/1483; H04L 63/168; H04L 63/0823; H04L 63/1408
See application file for complete search history.

(56) References Cited

U.S. PATENT DOCUMENTS

2007/0288696 A1* 12/2007 Repasi ................... G06F 21/51
711/135
2008/0034211 A1* 2/2008 Shull ................. H04L 29/12066
713/175
2008/0201464 A1* 8/2008 Campbell ........... H04L 12/2602
709/224

OTHER PUBLICATIONS

David Dagon et al., "Corrupted DNS Resolution Paths: The Rise of a Malicious Resolution Authority", Proc, 15th Network and Distributed System Security Symposium (NDSS), 2008.

* cited by examiner

*Primary Examiner* — Brandon Hoffman
*Assistant Examiner* — Nega Woldemariam
(74) *Attorney, Agent, or Firm* — Kenealy Vaidya LLP

(57) ABSTRACT

A method and system for discovering inappropriate and/or illegitimate use of Web page content, comprising: monitoring access to a first Web page by a user; comparing information from the first Web page to information from a second known legitimate Web page; and determining whether the first Web page is legitimate based on the compared information.

18 Claims, 4 Drawing Sheets

METHOD AND SYSTEM FOR MISUSE DETECTION

CROSS-REFERENCE TO RELATED APPLICATION

This application is a continuation of U.S. patent application Ser. No. 12/436,380 filed on May 6, 2009 and allowed on Jun. 5, 2015, which was based on and also derives the benefits of the filing date of U.S. Provisional Application No. 61/051,237, filed May 7, 2008, the contents of each of which are herein incorporated by reference in their entireties.

DESCRIPTION OF EMBODIMENTS

The unauthorized use of Web page code and content continues to be a major problem on the Internet. Unfortunately, a common use of this stolen or copied code facilitates various forms of online fraud, including, but not limited to, phishing attacks, in which copies or facsimiles of a legitimate Web page are created and used to fool users (and/or viewers, etc.) and to steal users' financial or personal information. To combat such online fraud, a method and system is provided for fraud detection. Such method and system can use technology to monitor and detect the misuse of legitimate Web code and content. An element (e.g., image, file, or other element) can be "served", or shown to the viewer, as part of a Web page and can be tracked every time that element is "called", or requested from the machine serving that element to the Web page (e.g., a legitimate server operating a legitimate Web site). Any time the element is requested for display to a user by any machine other than the legitimate one(s) authorized, this unauthorized request for the element can cause an appropriate party (e.g., the entity operating the legitimate Web site, a third party security company) to be alerted immediately to the unauthorized use, triggering any desired sequence of response measures.

Figure 1:
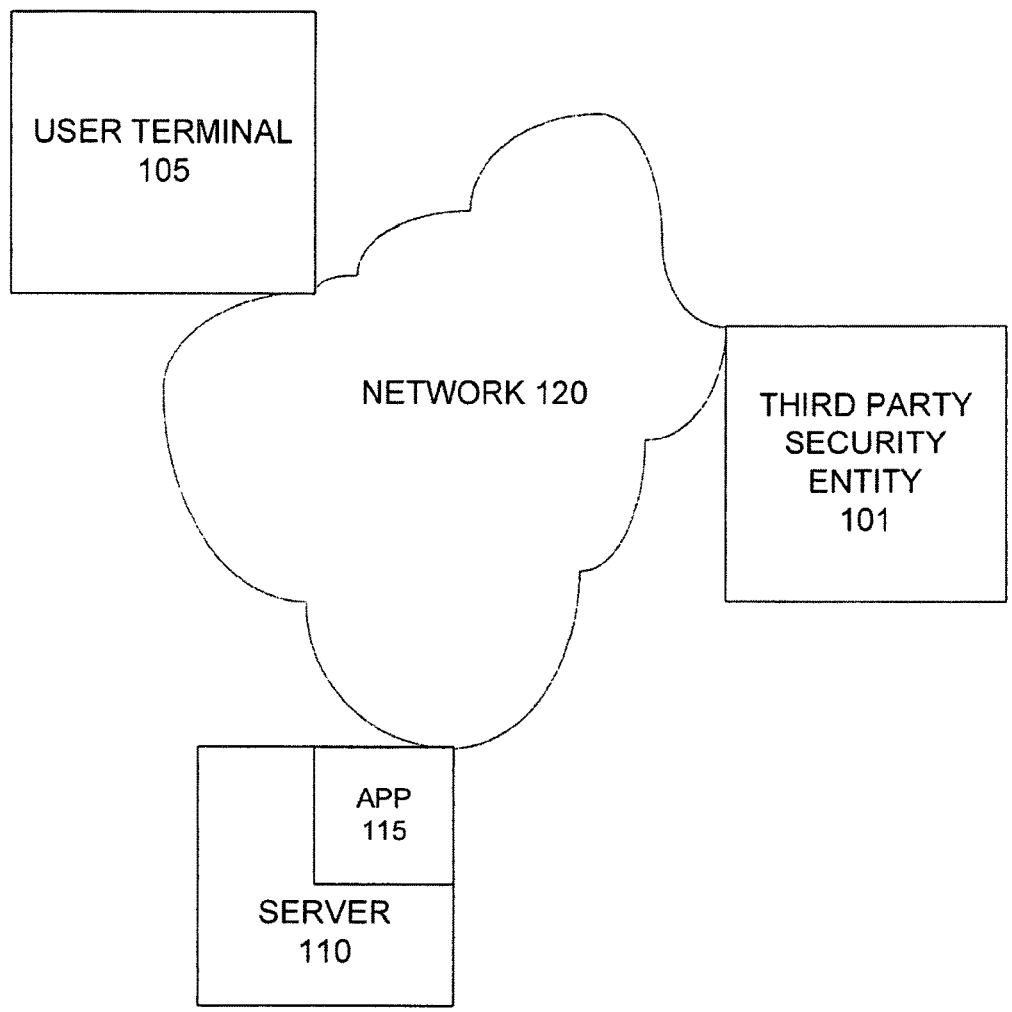
FIG. 1 illustrates a system for misuse detection, according to one embodiment.

FIG. 1 illustrates a system for misuse detection, according to one embodiment. A server 110 and a user terminal 105 can be coupled to a network 120. An application 115 can also be coupled to the network 120, although in some embodiments, the application can also be resident on the server 10. The system can help monitor misuse or illegitimate use of Web pages Web pages are collections of information typically written in HTML, XHTMl, or other programming languages such that the resulting file is viewable via Web browser applications. Web pages allow different types of data, files, content and connections to be integrated into a single electronic document. This electronic document can be connected via hyperlinks to other Web pages on the domain to create a Web site.

The actual code that makes up a Web page and causes the browser to render it as a viewable document is called the source code. By copying source code, identical copies of Web pages can be made, sometimes in only a matter of seconds. This functionality allows for the efficient creation of Web pages since, for example, Web pages in the same domain share common appearances and similar pages can be made by using existing ones as a template requiring only slight modifications. Unfortunately, this functionality also allows for easy unauthorized duplication of legitimate Web pages for purposes of fraud.

One of the more common scenarios of online fraud is when a criminal copies the source code of an organization's Web site for use in a phishing attack. Phishing can be defined as an attempt to acquire information (e.g., usernames, passwords, credit card details), by masquerading as a trustworthy or legitimate entity in an electronic communication. With respect to phishing and Web pages, a malicious user can create a false Web page that is virtually an identical copy of a legitimate Web page. Afterwards, the malicious user can send out emails that appear to be from the legitimate organization. The emails will use a variety of false ploys or claims to encourage the user/customer to click on a hyperlink that appears to be the Web address of the legitimate organization but is in fact a link to another Web site. Note that in some, but not all, embodiments, the visible address shown to the viewer and the actual address to which the link connects do not need to match, one of the reasons this sort of fraud is effective at fooling the email recipient. Thus, for example, it could appear as if a user is going to the Web site bank.com in order to enter in sensitive personal information, when in fact the user is actually going to the Web site badsite.com. Once clicked, the link to the malicious Web site will route the user to the false Web page where the user can be asked to login or provide other valuable information. The user can enter the login information or other important data, which is then harvested, emailed or otherwise captured by the malicious user. The malicious user, in turn, may use the information to facilitate various forms of online fraud and identity theft or give, trade or sell the information to others for similar misuse.

Figure 2:
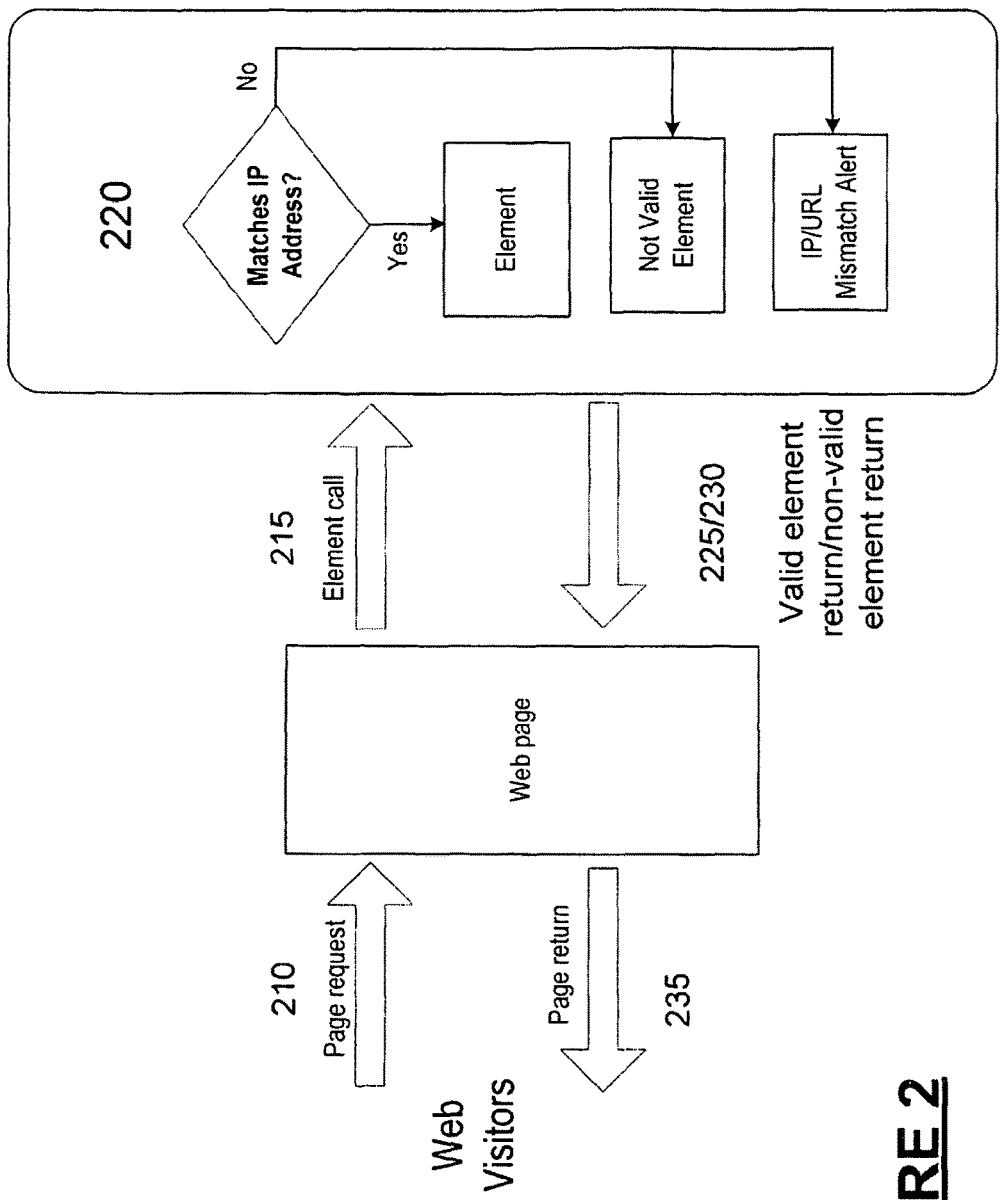
FIGS. 2-4 illustrate methods for misuse detection, according to several embodiments.

FIG. 2 illustrates a method for misuse detection, according to one embodiment. Misuse detection provides a mechanism for the tracking and early detection of Web pages that misuse protected code or content. The specific details of how the technology functions are illustrated and described with respect to FIGS. 2, 3, and 4. Before implementing the functionality of FIGS. 2, 3, and 4, a piece of code (e.g., application 115) is installed that can communicate with the legitimate web page or trusted third party security entity and can pull the element that can be prominently displayed on a Web page to visitors as a symbol of authenticity (e.g., a logo that says "secure Web page"). The application 115 can be installed at the Web page at a legitimate company's server 110, or in some other place. When a part of a Web page with the application 115 installed is copied and used by an unauthorized party, then the unauthorized use can be tracked and reported.

Referring to FIG. 2, in 210, a user requests a Web page from a Web site, such as www.bank.com. In 215, the application is triggered (i.e., the element is called/run), and the user's browser tells the Web page www.bank.com to request the element (e.g., security logo). The request can go to the third party security company which can check to see if the use is a fraudulent or inappropriate use of the Web page content (described in more detail below). (Note that in other embodiments, the request could go to another entity.) Because misusers of the Web page content are often copying exactly the Web page content, the misusers will thus copy the security application that been installed, which triggers the request for the element. Each time the Web page is loaded or viewed in a browser, it triggers this request or "call" for the element. In 215, the receiving server of the call (e.g., the server that owns the legitimate site bank.com) compares the requested Web page's information to the legitimate Web page's information. The compared information can include IP addresses, URLs, and/or domains, or any combination thereof. Other information can also be compared. If the compared information matches, then in 225, a valid element (e.g., logo) is returned and displayed on the Web page, which is also returned in 235. In this case, the user can see that the Web page is secure because of the valid element (e.g., a logo) that is displayed with the Web page. Note that, in one embodiment, the element can be displayed on the browser accessing the Web page, but it will look like the element is actually on the Web page. If the compared information does not match, a not valid element can be returned in 230 with the Web page in 235. In this case, the user can see that the Web page is not secure because of a logo or some other element displayed with the Web page that can, in one embodiment, warn the user of potential fraud.

Note that, in one embodiment, as indicated in 220, if there is not a match, then the requesting Web page's URL (e.g., badsite.com), IP address, or other information could be sent to the appropriate party (e.g., the owner of the legitimate Web site and/or a third party security company) for evaluation and analysis.

Figure 3:
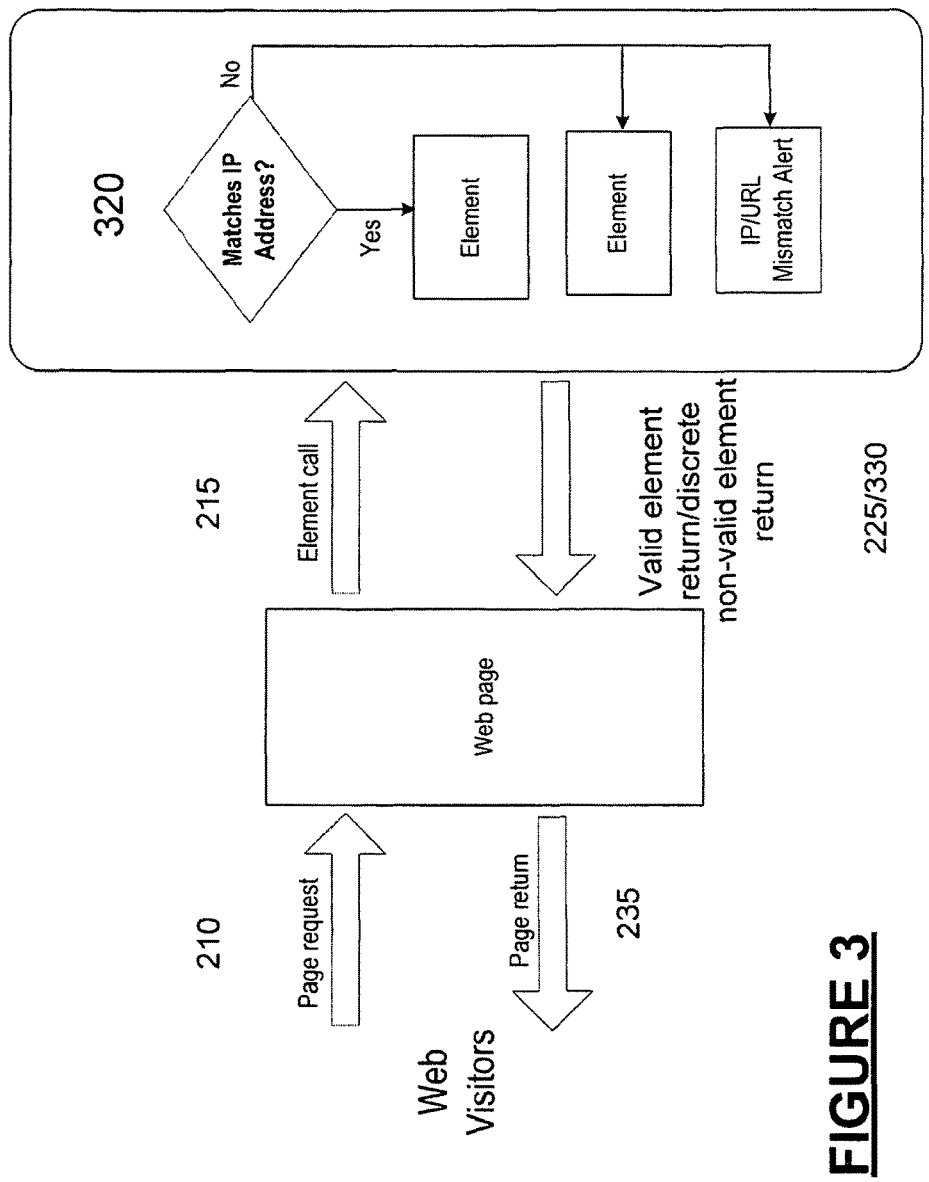

FIG. 3 illustrates a method of misuse detection, according to another embodiment. Note that all of the processes of FIG. 3 are the same as FIG. 2 (e.g., 210, 215, 225, 235), except that in 320, once it is determined that there is not a match, a discrete non-valid element is returned in 330 instead of the (obvious) non-valid element returned in 230 of FIG. 2. This can be done so that the determination of whether the Web page is legitimate or not is done in a discrete manner, that is, it is not visible on the Web page and would likely go unnoticed by the person stealing the Web page information without a very careful review.

This can help, for example, monitor, analyse, and/or catch fraudulent users of the Web page. The discrete non-valid element can be something that doesn't show up on the Web page, such as a pixel in the Web page source code altered in a manner that doesn't obviously impact the Web page. If the specific part(s) of the Web page that contains the embedded element is copied and used by an unauthorized party, then each call for the element provides the opportunity for alerting of unauthorized use. The receiving server of the call compares the requestor's information to the legitimate information of Web sites authorized to make the request for that element. Regardless of whether there is a match or mismatch, as far as both the viewer of the Web page and the Web page content thief are aware, nothing is amiss. However, in the case of a mismatch, the requesting Web page's information can be sent to an appropriate party for evaluation and analysis for potential online fraud.

Figure 4:
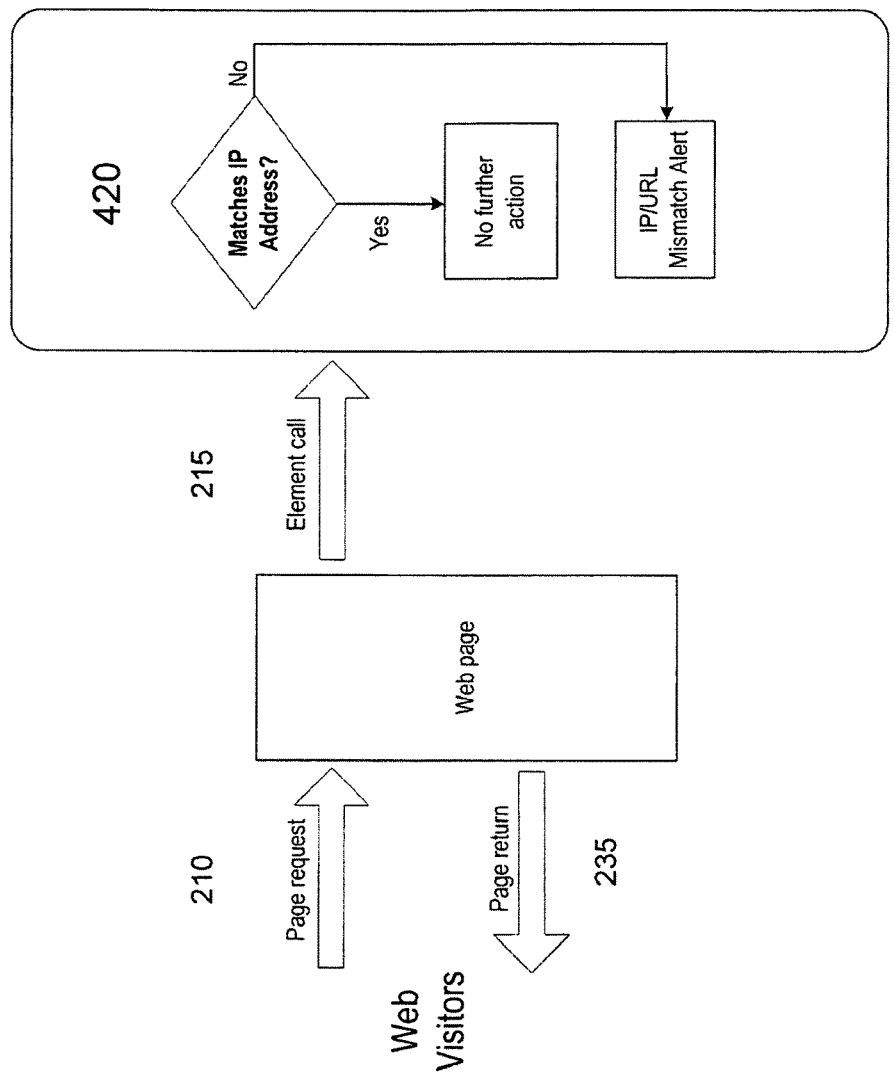

FIG. 4 illustrates a method of misuse detection, according to another embodiment. Note that all of the processes of FIG. 4 are the same as FIGS. 2 and 3 (e.g., 210, 215, 235), except that in 420, once it is determined that there is or is not a match, no element (either valid or not) is sent back with the Web page.

Note that, in one embodiment, the application installed at the Web page could include information (e.g., a FLASH program that instigates when the code is run), that can make it non-apparent to phishers or other malicious users, that the code is installed. The element is installed on a Webpage but disguised as an unsuspecting part of the Web page. If the specific part(s) of the Webpage that contains the element is copied and used by an unauthorized party, then the element performs a call to the receiving server upon use of the element. The call for the stealth element provides the Web page's information. This information is compared to the legitimate Web page's Information. If there is a match, then no further action is required. If there is a mismatch, then the Web page's information address is sent to the appropriate party for evaluation and analysis.

In all of the scenarios outlined in FIGS. 2-4, the common element is the use of an embedded element (e.g., image, file, or other element) that loads every time the Web page of interest is loaded in a browser. In this manner, the first time a criminal or scam artist even checks to see if the fraudulent Web page appears correctly in a browser, an alert can triggered to an appropriate party. In this manner, in one embodiment, potential early warning of a phishing attack or other online fraud can be given before the attack is launched or users are ever exposed to the scam.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above described exemplary embodiments.

In addition, it should be understood that any figures, screen shots, tables, examples, etc. which highlight the functionality and advantages of the present invention, are presented for example purposes only. The architecture of the present invention is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Furthermore, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A processor based system for determining whether potentially malicious digital media document content has been copied from legitimate digital media document content, the processor based system being installed with and operable by software, comprising:

a portion of code inserted into at least one of an embedded software element in the legitimate digital media document's content; wherein the portion of inserted code requests an application on a server, the application code being invisible in the source code of the digital media document content;

the portion of code performs a function of sending at least one query requesting a legitimate digital media document attribute, the attribute including at least one of an IP address, URL or domain name of the legitimate digital media document, the portion of code causes the processor to compare the legitimate digital media document attribute to an instantaneous digital media document attribute of the digital media document issuing the query;

the portion of code causes a processor to make a determination as to whether the attributes match; and an action occurs based on an outcome of the determination.

2. The system of claim 1, wherein the portion of inserted code has been inserted into at least one of an image, video, audio, or otherwise digital media document content.

3. The system of claim 1, wherein the portion of code causes a digital record to be created identifying at least one of the URL, domain, or IP address of the digital media document content as being potentially malicious.

4. The system of claim 1, wherein the portion of code causes a digital record to be created identifying at least one of the URL, domain, or IP address of the digital media document content as being potentially legitimate.

5. The system of claim 1, wherein a logo is visibly displayed following the query, the logo identifying whether or not the digital media document content is potentially malicious.

6. The system of claim 1, wherein a digital certificate, provided to the digital media document content, is not visibly displayed following the query, the digital certificate identifying whether or not the digital media document content is potentially malicious.

7. A non-transitory storage medium that is configured to store software for determining whether potentially malicious digital media document content has been copied from legitimate digital media document content, the software comprising:

a portion of code inserted into at least one of an embedded software element in the legitimate digital media document's content; wherein the portion of inserted code requests an application on a server, the application code being invisible in the source code of the digital media document content;

the portion of code performs a function of sending at least one query requesting a legitimate digital media document attribute, the attribute including at least one of an IP address, URL or domain name of the legitimate digital media document, the portion of code causes a processor to compare the legitimate digital media document attribute to an instantaneous digital media document attribute of the digital media document issuing the query;

the portion of code causes the processor to make a determination as to whether the attributes match; and an action occurs based on an outcome of the determination.

8. The apparatus of claim 7, wherein the portion of inserted code has been inserted into at least one of an image, video, audio, or otherwise digital media document content.

9. The apparatus of claim 7, wherein the portion of code causes a digital record to be created identifying at least one of the URL, domain, or IP address of the digital media document content as being potentially malicious.

10. The apparatus of claim 7, wherein the portion of code causes a digital record to be created identifying at least one of the URL, domain, or IP address of the digital media document content as being potentially legitimate.

11. The apparatus of claim 7, wherein a logo is visibly displayed following the query, the logo identifying whether or not the digital media document content is potentially malicious.

12. The apparatus of claim 7, wherein a digital certificate is provided to the digital media document content is not visibly displayed following the query, the digital certificate identifying whether or not the digital media document content is potentially malicious.

13. A method for determining whether potentially malicious digital media document content has been copied from legitimate digital media document content, comprising:

inserting a portion of code into at least one of an embedded software element in the legitimate digital media document's content, the portion of inserted code requests an application on a server, the application code being invisible in the source code of the digital media document content;

sending at least one query by the portion of code, the query requesting a legitimate digital media document attribute, the attribute including at least one of an IP address, URL or domain name of the legitimate digital media document;

comparing the legitimate digital media document attribute to an instantaneous digital media document attribute of the digital media document issuing the query;

causing a processor to make a determination as to whether the attributes match; and causing an action to occur based on an outcome of the determination.

14. The method of claim 13, further comprising inserting the portion of code into at least one of an image, video, audio, or otherwise digital media document content.

15. The method of claim 13, further comprising causing a digital record to be created that identifies at least one of the URL, domain, or IP address of the digital media document content as being potentially malicious.

16. The method of claim 13, further comprising causing a digital record to be created that identifies at least one of the URL, domain, or IP address of the digital media document content as being potentially legitimate.

17. The method of claim 13, further comprising visibly displaying a logo following the query, the logo identifying whether or not the digital media document content is potentially malicious.

18. The method of claim 13, further comprising providing a digital certificate to the digital media document content that is not visibly displayed following the query, the digital certificate identifying whether or not the digital media document content is potentially malicious.

* * * * *